(12) United States Patent
Holzhei

(10) Patent No.: US 8,162,767 B2
(45) Date of Patent: Apr. 24, 2012

(54) BOOT FOR A CONSTANT VELOCITY JOINT

(75) Inventor: Michael J. Holzhei, Saginaw, MI (US)

(73) Assignee: Steering Solutions IP Holding Company, Saginaw, MI (US)

( * ) Notice: Subject to any disclaimer, the term of this patent is extended or adjusted under 35 U.S.C. 154(b) by 266 days.

(21) Appl. No.: 12/426,642

(22) Filed: Apr. 20, 2009

(65) Prior Publication Data
US 2009/0289419 A1 Nov. 26, 2009

Related U.S. Application Data

(60) Provisional application No. 61/055,660, filed on May 23, 2008.

(51) Int. Cl.
*F16D 3/84* (2006.01)
(52) U.S. Cl. ........................ 464/175; 464/906
(58) Field of Classification Search .......... 464/173–175, 464/904–906; 403/50, 51; 277/634–636
See application file for complete search history.

(56) References Cited

U.S. PATENT DOCUMENTS

| | | | | |
|---|---|---|---|---|
| 2,308,073 A | * | 1/1943 | Hagerty | 464/175 |
| 2,386,754 A | * | 10/1945 | Sayder | 464/175 |
| 2,432,803 A | * | 12/1947 | Rice | 464/175 |
| 2,442,640 A | * | 6/1948 | Dunn | 464/175 |
| 2,755,641 A | * | 7/1956 | Dunn | 464/175 |
| 3,204,427 A | * | 9/1965 | Dunn | 464/175 |
| 3,362,193 A | * | 1/1968 | Ritsema | 464/175 |
| 4,116,020 A | | 9/1978 | Aucktor et al. | |
| 4,196,598 A | * | 4/1980 | Hirai et al. | |
| 4,320,632 A | | 3/1982 | Dore | |
| 4,443,207 A | * | 4/1984 | Buthe et al. | 464/175 |
| 4,786,272 A | * | 11/1988 | Baker | 464/175 |
| 5,122,096 A | | 6/1992 | Aucktor et al. | |
| 5,419,741 A | | 5/1995 | Schwarzler | |
| 5,707,066 A | | 1/1998 | Sugiura et al. | |
| 5,836,824 A | | 11/1998 | Konegen et al. | |
| 6,159,103 A | | 12/2000 | Lu | |
| 6,361,444 B1 | | 3/2002 | Cheney et al. | |

(Continued)

FOREIGN PATENT DOCUMENTS

GB 598584 A 2/1948

(Continued)

OTHER PUBLICATIONS

European Search Report and Office Action dated Aug. 6, 2009 for International Application No. 09160410.8.

*Primary Examiner* — Gregory Binda
*Assistant Examiner* — Josh Skroupa
(74) *Attorney, Agent, or Firm* — Cantor Colburn LLP

(57) ABSTRACT

A constant velocity joint assembly includes an outer joint member and an inner joint member. A first shaft is coupled to the inner joint member for articulated movement with the inner joint member relative to the outer joint member. A boot is coupled to the first shaft and the outer joint member to seal the constant velocity joint assembly. An insert is secured to and supported within the boot adjacent to and in abutting engagement with an axial end of the outer joint member. The insert limits movement of the first shaft to within a predetermined range of articulation to prevent disengagement and/or disassembly of the inner joint member relative to the outer joint member.

26 Claims, 1 Drawing Sheet

U.S. PATENT DOCUMENTS

| | | |
|---|---|---|
| 6,402,999 B1 | 6/2002 | Sadr et al. |
| 6,478,309 B1 | 11/2002 | Miyamoto et al. |
| 6,579,187 B2 | 6/2003 | Ramey |
| 7,347,787 B2 | 3/2008 | Ohshita et al. |
| 7,371,181 B2 | 5/2008 | Kozlowski et al. |
| 7,396,286 B2 | 7/2008 | Sueoka et al. |
| 7,445,557 B2 | 11/2008 | Toriumi et al. |
| 7,488,258 B2 | 2/2009 | Ono et al. |
| 2005/0051972 A1* | 3/2005 | Wang .................... 277/634 |
| 2005/0192107 A1* | 9/2005 | Toriumi et al. ........... 464/175 |

FOREIGN PATENT DOCUMENTS

| | | |
|---|---|---|
| GB | 2000573 A | 1/1979 |
| GB | 2295426 A | 5/1996 |
| JP | 58225221 A | 12/1983 |
| JP | 2007113616 A | 5/2007 |

* cited by examiner

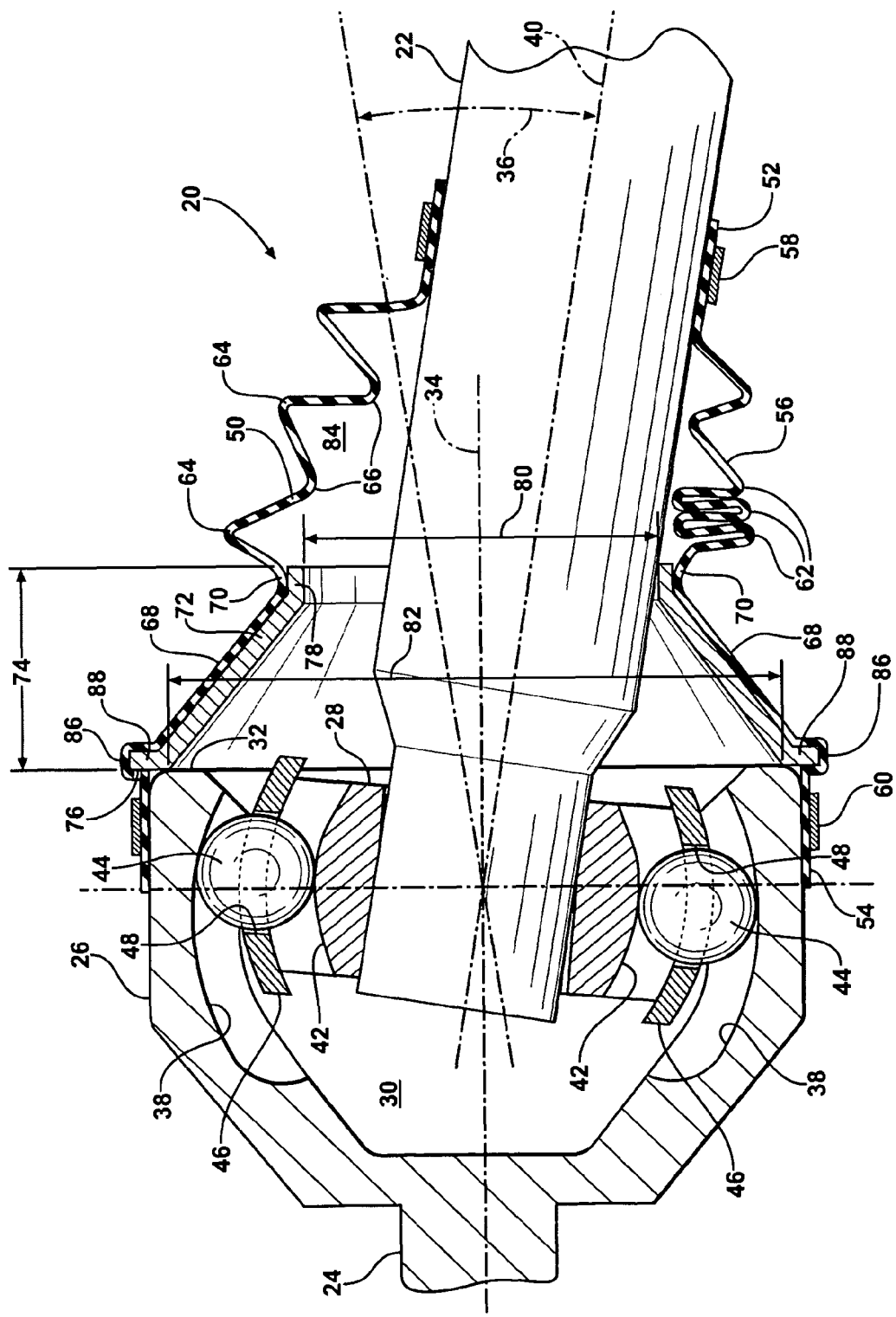

BOOT FOR A CONSTANT VELOCITY JOINT

CROSS REFERENCE TO RELATED APPLICATION

This application claims the benefit of U.S. Provisional Patent Application Ser. No. 61/055,660, filed on May 23, 2008, the disclosure of which is hereby incorporated by reference.

BACKGROUND OF THE INVENTION

1. Field of the Invention

The subject invention relates to a constant velocity joint assembly, and more specifically to a boot for a constant velocity joint assembly.

2. Description of the Prior Art

Constant velocity joints are typically employed in automotive axial drive shafts, and especially in front-wheel-drive vehicles between the transaxle differential and the driving wheel. The constant velocity joints transmit a torque at various speeds, angles and telescopic positions between a first shaft and a second shaft.

Many styles of constant velocity joints exist. Often, the constant velocity joint includes an outer joint member and an inner joint member. The first shaft is coupled to the inner joint member and the second shaft is coupled to the outer joint member. The first shaft and the second shaft may be integrally formed with the inner joint member and/or the outer joint member respectively. The outer joint member defines a cavity, and includes an axial end disposed along a longitudinal axis. The inner joint member is disposed within the cavity, and is moveable with the first shaft relative to the outer joint member for articulated movement relative to the outer joint member.

Typically, the constant velocity joint includes a flexible boot. The boot seals the cavity from dirt and debris. The boot is typically coupled to the first shaft and to the outer joint member of the constant velocity joint.

Many styles of the constant velocity joint are sensitive to over-articulation, and disassembly in response to over-articulation beyond a pre-determined maximum range of articulation. One such style of constant velocity joint that is subject to disassembly in response to over-articulation is commonly known as an Aucktor style constant velocity joint. Aucktor style constant velocity joints include a plurality of drive balls disposed between pairs of opposing grooves defined by the outer joint member and the inner joint member.

In order to prevent over-articulation of constant velocity joints, such as the Aucktor style constant velocity joint, it is known to attach an articulation limiting device, commonly referred to as a can, directly to the outer joint member. The articulation limiting device may extend outward along the longitudinal axis away from the axial end of the outer joint member or may extend radially inward toward the longitudinal axis to limit articulation of the first shaft member and prevent disassembly of the constant velocity joint. The boot is coupled to the outer joint member via the articulation limiting device, i.e., the boot is attached to the articulation limiting device, and the articulation limiting device is attached to the outer joint member.

There remains a need to reduce the cost of the constant velocity joints while increasing the speed of assembling the constant velocity joints.

SUMMARY OF THE INVENTION AND ADVANTAGES

The subject invention provides a constant velocity joint assembly. The constant velocity joint assembly comprises an outer joint member and an inner joint member. The outer joint member defines a cavity, and includes an axial end disposed along a longitudinal axis of the outer joint member. The inner joint member is disposed within the cavity. The inner joint member is moveable relative to the outer joint member. A shaft is coupled to the inner joint member. The shaft is moveable with the inner joint member for articulated movement of the shaft and the inner joint member relative to the outer joint member. A boot seals the cavity. The boot comprises a first end portion connected to the shaft, and a second end portion connected to the outer joint member. A bellows portion extends between the first end portion and the second end portion. An insert is supported by the boot and positioned by the boot adjacent to and in abutting engagement with the axial end of the outer joint member. The insert limits the articulated movement of the shaft and the inner joint member relative to the outer joint member to prevent disengagement of the inner joint member from the outer joint member.

Accordingly, the subject invention incorporates the insert into the boot. The boot positions and secures the insert relative to the outer joint member. As such, the insert is not directly connected to the outer joint member, but is secured in place relative to the outer joint member by the boot. The boot is directly connected to the shaft and the outer joint member. Therefore, assembly of the constant velocity joint only requires attaching the boot to the outer joint member, thereby eliminating the can utilized in the prior art and the connection thereof, and simplifying the assembly of the constant velocity joint.

BRIEF DESCRIPTION OF THE DRAWING

Other advantages of the present invention will be readily appreciated, as the same becomes better understood by reference to the following detailed description when considered in connection with the accompanying drawings.

FIG. 1 is a cross sectional view of a constant velocity joint assembly.

DETAILED DESCRIPTION OF THE INVENTION

Referring to the Figures, wherein like numerals indicate corresponding parts throughout the several views, a constant velocity joint assembly is shown generally at 20. The constant velocity joint assembly 20 transmits a torque at various speeds, angles and telescopic positions between a first shaft 22 and a second shaft 24.

The constant velocity joint assembly 20 is typically employed in automotive axial drive shafts, and especially in front-wheel-drive vehicles between a transaxle differential and a driving wheel. However, it should be appreciated that the constant velocity joint assembly 20 may be utilized in other applications not described herein.

The constant velocity joint assembly 20 includes an outer joint member 26 and an inner joint member 28. The first shaft 22 is coupled to the inner joint member 28, and the second shaft 24 is coupled to the outer joint member 26. Preferably, the first shaft 22 is coupled to the inner joint member 28 via a splined connection therebetween, in which the inner joint member 28 defines a splined aperture and the first shaft 22 defines a splined end in interlocking engagement with the splined aperture. Alternatively, the first shaft 22 and the inner joint member 28 may be coupled together in some other manner not shown or described herein. It should also be appreciated that the first shaft 22 and the inner joint member 28 may be integrally formed together as a single component. Preferably, the second shaft 24 and the outer joint member 26 are integrally formed together as a single component. However, it should be appreciated that the outer joint member 26 and the second shaft 24 may be separate components coupled together via a suitable connection, such as through a plurality of fasteners.

The outer joint member 26 defines a cavity 30, and includes an axial end 32 disposed along a longitudinal axis 34 of the outer joint member 26. The axial end 32 of the outer joint member 26 is the end surface of the outer joint member 26, which is disposed generally perpendicular and transverse to the longitudinal axis 34 of the outer joint member 26. The inner joint member 28 is disposed within the cavity 30 of the outer joint member 26. The inner joint member 28 is moveable relative to the outer joint member 26. As such, the first shaft 22 is moveable with the inner joint member 28 for articulated movement of the shaft and the inner joint member 28 relative to the outer joint member 26.

The first shaft 22 and the inner joint member 28 are freely moveable relative to the outer joint member 26 within a pre-determined range of articulation 36. The pre-determined range of articulation 36 is measured relative to the longitudinal axis 34, and delimits the maximum desirable operating range of the constant velocity joint assembly 20. Accordingly, it should be appreciated that articulation of the first shaft 22 and the inner member beyond the pre-determined range of articulation 36 may result in disengagement or disassembly of the inner joint member 28 from the outer joint member 26.

As shown and described herein, the constant velocity joint assembly 20 includes an Aucktor style constant velocity joint. However, it should be appreciated that the constant velocity joint assembly 20 member may include some other style of constant velocity joint not shown or described herein, and is not limited to the specific embodiment shown and described herein. As shown, the outer joint member 26 defines a plurality of outer grooves 38. The outer grooves 38 are radially disposed about and extend along the longitudinal axis 34. The inner joint member 28 extends along a shaft axis 40. The inner joint member 28 defines a plurality of inner grooves 42. The inner grooves 42 are radially disposed about and extend along the shaft axis 40. Each of the plurality of inner grooves 42 is disposed in opposition to one of the plurality of outer grooves 38. Accordingly, each of the plurality of inner grooves 42 cooperates with one of the plurality of outer grooves 38 to define a funnel.

The constant velocity joint assembly 20 further comprises a plurality of drive balls 44. One of the drive balls 44 is partially disposed in rolling engagement within one of the inner grooves 42, and is also partially disposed in rolling engagement within one of the outer grooves 38. The drive balls 44 transmit a torque between the outer joint member 26 and the inner joint member 28. The drive balls 44 roll along the inner grooves 42 and the outer grooves 38 as the first shaft 22 and the inner joint member 28 articulate relative to the outer joint member 26.

A cage 46 is disposed between the inner joint member 28 and the outer joint member 26. The cage 46 defines a plurality of windows 48 with one of the plurality of drive balls 44 disposed within each of the plurality of windows 48. The cage 46 positions the drive balls 44 within a plane and steers the drive balls 44 as a unit as the first shaft 22 and the inner joint member 28 articulate relative to the outer joint member 26.

The constant velocity joint assembly 20 further includes a boot 50. The boot 50 seals the cavity 30 from dirt and debris. The boot 50 includes a flexible material chosen from a group of materials comprising, but not limited too, an elastomeric material and a thermoplastic material. It should be appreciated that the flexible material may include some other material not described herein.

The boot 50 includes a first end portion 52 connected to the first shaft 22, a second end portion 54 connected to the outer joint member 26 and a bellows portion 56 extending between the first end portion 52 and the second end portion 54.

Preferably, a first clamp 58 is in clamping engagement with the first end portion 52 of the boot 50. The first clamp 58 secures the first end portion 52 of the boot 50 to the first shaft 22. A second clamp 60 is in clamping engagement with the second end portion 54 of the boot 50. The second clamp 60 secures the second end portion 54 of the boot 50 to the outer joint member 26. Alternatively, it should be appreciated that some other device and or interlocking configuration not shown or described herein may be utilized to secure the first end portion 52 and the second end portion 54 to the first shaft 22 and the outer joint member 26 respectively.

The bellows portion 56 of the boot 50 includes a plurality of convolutions 62. The convolutions define a plurality of alternating crests 64 and valleys 66. The plurality of convolutions 62 includes a first convolute 68 disposed adjacent and nearest to the second end portion 54 of the boot 50. The first convolute 68 defines a first valley 70. The first convolute 68 extends from the second end portion 54 of the boot 50 to the first valley 70. The first valley 70 is disposed adjacent the second end portion 54 of the boot 50, near the axial end 32 of the outer joint member 26.

The boot 50 further includes an insert 72. The insert 72 is supported by the boot 50 and is positioned by the boot 50 adjacent to and in abutting engagement with the axial end 32 of the outer joint member 26. Notably, the insert 72 is not directly connected to the outer joint member 26, but rather is connected to the boot 50 with the boot 50 securing the position of the insert 72 relative to the outer joint member 26.

The insert 72 includes a rigid material. The rigid material may be chosen from, but is not limited too, a group of materials comprising a plastic material and a metal material. It should be appreciated that the rigid material may include some other material not described herein.

The insert 72 extends a pre-determined length 74 from the axial end 32 of the outer joint member 26 along the longitudinal axis 34 toward the first end portion 52 of the boot 50. Preferably, the insert 72 extends the pre-determined length 74 along the longitudinal axis 34 from the axial end 32 of the outer joint member 26 to the first valley 70 of the first convolute 68.

The insert 72 includes a truncated conical shape along the longitudinal axis 34. The insert 72 includes a support end 76 and a restraining end 78. The support end 76 abuts the axial end 32 of the outer joint member 26. The restraining end 78 is axially spaced from the support end 76 along the longitudinal axis 34. The restraining end 78 defines a first diameter 80. The support end 76 defines a second diameter 82 larger than the first diameter 80. The first diameter 80 and the second diameter 82 cooperate to define the truncated conical shape.

The second diameter 82 of the support end 76 is approximately sized to mate with the axial end 32 of the outer joint member 26. Upon the first shaft 22 articulating about the longitudinal axis 34 up to the maximum articulation defined by the pre-determined range of articulation 36, the first shaft 22 contacts the restraining end 78 of the insert 72, which restricts further articulation beyond the pre-determined range of articulation 36.

Preferably, the restraining end 78 of the insert 72 and the first valley 70 are adjacent each other and aligned along the longitudinal axis 34. Also preferably, but not necessarily, the first convolute 68 includes a thickened cross section relative to a remainder of the bellows portion 56 of the boot 50. In other words, the first convolute 68, between the second end portion 54 and the first valley 70, is thicker than the rest of the bellows portion 56 of the boot 50. This thickened section increases the rigidity of the boot 50 and assists in securing the insert 72 in place relative to the outer joint member 26.

The boot 50 defines an interior 84, with the insert 72 being disposed within the interior 84 of the boot 50. The boot 50 defines an annular groove 86 extending radially outward relative to the longitudinal axis 34. The annular groove 86 is disposed adjacent the second end portion 54 of the boot 50, adjacent the axial end 32 of the outer joint member 26. The insert 72 includes a radial flange 88 extending radially outward from the longitudinal axis 34. The radial flange 88 is disposed on the support end 76 of the insert 72. The radial flange 88 is disposed within the annular groove 86 of the boot 50 to position the insert 72 within the boot 50 relative to the outer joint member 26. Accordingly, the annular flange is in interlocking engagement with the annular groove 86 such that the insert 72 is prevented from moving within the boot 50, and is thereby secured in place by the boot 50 relative to the outer joint member 26. It should be appreciated that the boot 50 and the insert 72 may be configured in some other manner not shown or described herein to achieve an interlocking engagement therebetween.

As described above, the insert 72 limits the articulated movement of the shaft and the inner joint member 28 relative to the outer joint member 26 to within the pre-determined range of articulation 36 to prevent disengagement and/or disassembly of the inner joint member 28 from the outer joint member 26. The range of articulation 36 is dependent upon the first diameter 80 of the restraining end 78 and the pre-determined length 74 of the insert 72. The range of articulation 36 is adjusted by modifying either of the first diameter 80 of the restraining end 78 and/or the pre-determined length 74 of the insert 72. The range of articulation 36 increases with an increase in the first diameter 80 of the restraining end 78 and/or with a decrease in the pre-determined length 74 of the insert 72. The range of articulation 36 decreases with a decrease in the first diameter 80 of the restraining end 78 and/or with an increase in the pre-determine length of the insert 72.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. The use of the word "said" in the apparatus claims refers to an antecedent that is a positive recitation meant to be included in the coverage of the claims whereas the word "the" precedes a word not meant to be included in the coverage of the claims. In addition, any reference numerals present in the claims are merely for convenience and are not to be read in any way as limiting. It is, therefore, to be understood that within the scope of the appended claims, the invention may be practiced otherwise than as specifically described.

What is claimed is:

1. A constant velocity joint assembly comprising:
    an outer joint member defining a cavity and having an axial end disposed along a longitudinal axis of said outer joint member;
    an inner joint member disposed within said cavity and moveable relative to said outer joint member;
    a shaft coupled to said inner joint member and moveable with said inner joint member for articulated movement of said shaft relative to said longitudinal axis;
    a boot for sealing said cavity, wherein said boot comprises:
    a first end portion connected to said shaft;
    a second end portion connected to said outer joint member;
    a bellows portion extending between said first end portion and said second end portion; and
    an insert supported by said boot and positioned by said boot adjacent to and in abutting engagement with said axial end of said outer joint member, said insert being positioned to contact said shaft when the shaft is moved transversely to its longitudinal direction, said insert having a restraining end that is axially spaced from said axial end of said outer joint member, said restraining end having a diameter about the longitudinal axis that is defined so as to said articulated movement of said shaft relative to said longitudinal axis to within a predetermined range of articulation, to thereby prevent disengagement of said inner joint member from said outer joint member.

2. A constant velocity joint assembly as set forth in claim 1 wherein said insert extends from said axial end of said outer joint member along said longitudinal axis toward said first end portion of said boot a predetermined length.

3. A constant velocity joint assembly as set forth in claim 2 wherein said insert includes a truncated conical shape along said longitudinal axis.

4. A constant velocity joint assembly as set forth in claim 3 wherein said insert includes a support end abutting said axial end of said outer joint member and a restraining end axially spaced from said support end along said longitudinal axis, wherein said restraining end defines a first diameter and said support end defines a second diameter larger than said first diameter to define said truncated conical shape.

5. A constant velocity joint assembly as set forth in claim 4 wherein said shaft is freely moveable relative to said outer joint member within a range of articulation measured relative to said longitudinal axis with said range of articulation dependent upon said first diameter of said restraining end and said predetermined length of said insert.

6. A constant velocity joint assembly as set forth in claim 4 wherein said insert includes a rigid material chosen from a group of materials comprising a plastic material and a metal material.

7. A constant velocity joint assembly as set forth in claim 4 wherein said boot defines an interior and said insert is disposed within said interior of said boot.

8. A constant velocity joint assembly as set forth in claim 4 wherein said bellows portion includes a plurality of convolutions defining a plurality of alternating crests and valleys, wherein said plurality of convolutions includes a first convolute defining a first valley disposed adjacent second end portion.

9. A constant velocity joint assembly as set forth in claim 8 wherein said restraining end of said insert and said first valley are adjacent each other and aligned along said longitudinal axis.

10. A constant velocity joint assembly as set forth in claim 8 wherein said first convolute includes a thickened cross section relative to a remainder of said bellows portion of said boot.

11. A constant velocity joint assembly as set forth in claim 10 wherein said boot includes a flexible material chosen from a group of materials consisting of an elastomeric material and a thermoplastic material.

12. A constant velocity joint assembly as set forth in claim 1 wherein said boot defines an annular groove extending radially outward relative to said longitudinal axis.

13. A constant velocity joint assembly as set forth in claim 12 wherein said insert includes a radial flange extending radially outward from said longitudinal axis and disposed within said annular groove to position said insert within said boot relative to said outer joint member.

14. A constant velocity joint assembly as set forth in claim 1, wherein said insert is configured to resist movement of the shaft in a direction transverse to the longitudinal axis.

15. A boot assembly for a constant velocity joint including an outer joint member, an inner joint member and a shaft coupled to the inner joint member, said boot assembly comprising:
   a first end portion configured for attachment to the shaft;
   a second end portion configured for attachment to the outer joint member;
   a bellows portion extending between said first end portion and said second end portion; and
   an insert supported by said boot and positioned by said boot for abutting engagement with an axial end of the outer joint member along a longitudinal axis for limiting articulated movement of the shaft relative to the longitudinal axis of the outer joint member to within a pre-determined range of articulation;
   said insert being positioned to contact said shaft when the shaft is moved transversely to its longitudinal direction.

16. A boot assembly as set forth in claim 15 wherein said insert extends from the axial end of the outer joint member along said longitudinal axis toward said first end portion of said boot a pre-determined length.

17. A boot assembly as set forth in claim 16 wherein said insert includes a truncated conical shape along said longitudinal axis.

18. A boot assembly as set forth in claim 17 wherein said insert includes a support end abutting the axial end of the outer joint member and a restraining end axially spaced from said support end along said longitudinal axis, wherein said restraining end defines a first diameter and said support end defines a second diameter larger than said first diameter to define said truncated conical shape.

19. A boot assembly as set forth in claim 18 wherein said insert includes a rigid material chosen from a group of materials comprising a plastic material and a metal material.

20. A boot assembly as set forth in claim 18 wherein said boot defines an interior and said insert is disposed within said interior of said boot.

21. A boot assembly as set forth in claim 18 wherein said bellows portion includes a plurality of convolutions defining a plurality of alternating crests and valleys, wherein said plurality of convolutions includes a first convolute defining a first valley disposed adjacent second end portion.

22. A boot assembly as set forth in claim 21 wherein said restraining end of said insert and said first valley are adjacent each other and aligned along said longitudinal axis.

23. A boot assembly as set forth in claim 21 wherein said first convolute includes a thickened cross section relative to a remainder of said bellows portion of said boot.

24. A boot assembly as set forth in claim 15 wherein said boot defines an annular groove extending radially outward relative to said longitudinal axis.

25. A boot assembly as set forth in claim 24 wherein said insert includes a radial flange extending radially outward from said longitudinal axis and disposed within said annular groove to position said insert within said boot relative to said outer joint member.

26. A boot assembly as set forth in claim 15 wherein said boot includes a flexible material chosen from a group of materials consisting of an elastomeric material and a thermoplastic material.

* * * * *